July 10, 1934.                P. H. WILSON                1,965,915
                                PIPE JOINT
                    Filed May 29, 1933          2 Sheets-Sheet 1
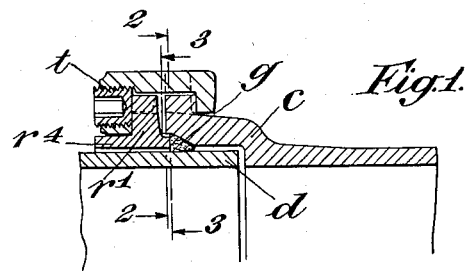
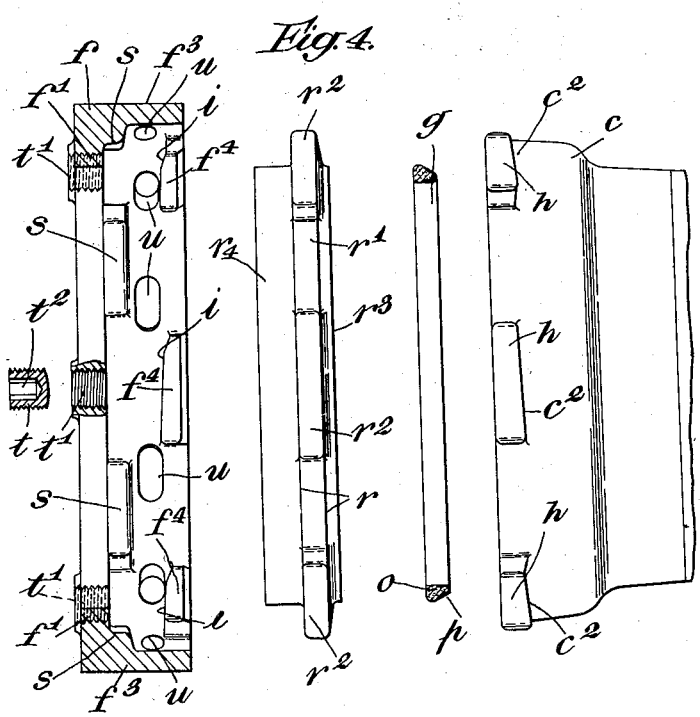
P. H. Wilson
       INVENTOR
By: Marks & Clerk
            Attys.

July 10, 1934.  P. H. WILSON  1,965,915
PIPE JOINT
Filed May 29, 1933  2 Sheets-Sheet 2

P. H. Wilson
INVENTOR

By Marks & Clerk
ATTYS

Patented July 10, 1934

1,965,915

UNITED STATES PATENT OFFICE 1,965,915

PIPE JOINT

Percy Hutchinson Wilson, Nottingham, England, assignor of one-half to The Stanton Ironworks Company, Limited, Stanton-by-Dale, near Nottingham, England Application May 29, 1933, Serial No. 673,546
In Great Britain June 8, 1932

7 Claims. (Cl. 285—164)

This invention relates to pipe joints of the kind in which the jointing material is positioned between overlapping end regions of the adjacent sections of pipe and is retained in position by pressure in an axial direction.

In an already available construction of joint of the above kind axial pressure is applied to the jointing material simply by rotational movement of a rigid element which loosely encircles the end region of at least one of the male and female pipe sections and engages directly or indirectly with the socket or female end and with the jointing material. In a general way the said rigid element, or joint retaining ring is caused to move axially relative to the socket by the helical sliding action of a plurality of projections or like engaging means provided on or in connection with said retaining ring, upon engaging complementary projections on or in connection with the outer periphery of the socket, the interengaging faces of said projections being inclined at an angle to a plane normal to the axis of the pipes.

It has been found that while pipe joints constructed in accordance with the foregoing principles afford very satisfactory sealing with flexibility when employed with pipes of a diameter up to, say, 12 to 15 inches, they become less effective at increasing diameters due to the fact that the rotational movement of the encircling element employed for forcing home the jointing material, usually a resilient or yielding material such as rubber, produces, notwithstanding the use of lubricants, a form of distortion of the jointing material which results in a loss of pressure tightness and necessitates said element being further advanced to tightening up pressures such as are not only objectionably heavy but are also difficult to achieve in larger diameter pipes. Besides having as an object to overcome such disadvantages as the above, the present invention aims at obviating, as far as possible, machining of the various co-operating surfaces of the joint which is essential to the satisfactory functioning of the constructions of joint already disclosed, with a view not only to facilitating and cheapening the manufacture of pipes of larger sizes but also, in pipes irrespective of size, to preserving unbroken the highly resistant skin on cast metals of which the pipes and joint fittings are made and in this way reducing corrosion and the resulting maintenance costs.

The invention consists in the improvement in or modification of the type of pipe joints referred to above wherein the desired tightening up pressure is achieved in part by a straight axial movement of an element engageable with the jointing material in relation to said encircling element and independent of rotational movement thereof.

The invention further consists in the improvement in or modification of the said type of pipe joints which consists in providing for a preliminary pressure being applied to the jointing material insufficient to produce objectionable circumferential distortion thereof by the rotational movement of said encircling ring and for further pressure being thereupon applied without continuing said rotational movement.

The invention further consists in a pipe joint of the kind referred to comprising a joint-retaining ring and an encircling element helically advanceable to move said ring through abutments extendible axially in relation to said encircling element.

The invention further consists in a pipe joint in accordance with the preceding paragraph wherein said joint-retaining ring comprises a portion adapted to be axially met by screw means carried by said encircling element.

The invention further consists in pipe joints and improvements in or modifications of the class of pipe joints referred to above, substantially as hereinafter set forth.

Referring now to the accompanying drawings:—

Figure 1 is a fragmental section, on the broken line 1—1 of Figure 3, of a spigot and socket pipe joint according to the present invention.

Figure 4 is a composite part sectional side elevation showing elements constituting the jointing the other figures in axially separated condition.

Figure 2:
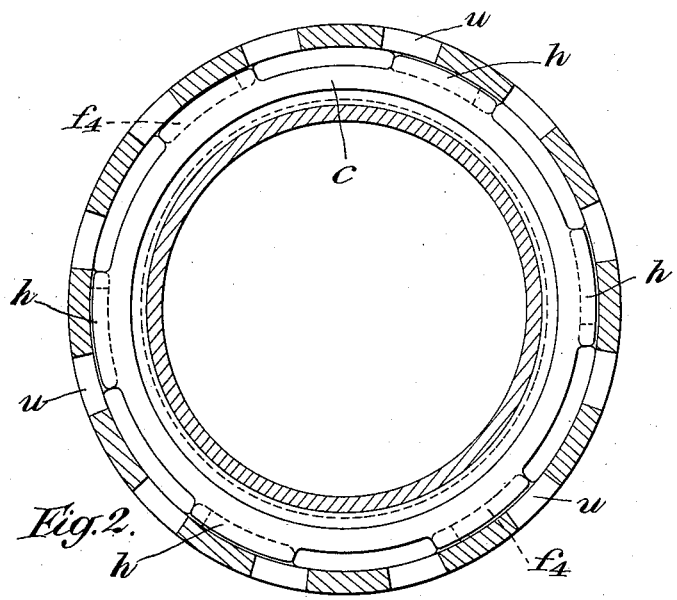
Figure 2 is a cross section of a joint as in Figure 1 on the broken line 2—2 and viewed in the direction of the adjoining arrows.
Figure 3:
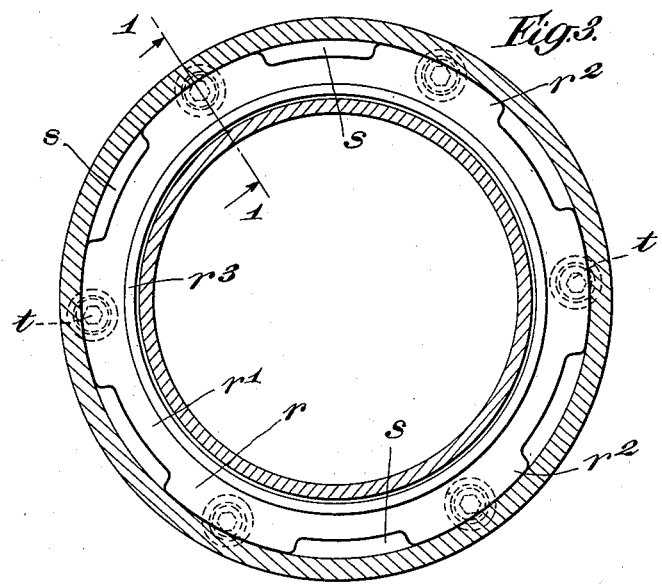
Figure 3 is a cross section viewed on the line 3—3 of Figure 1, in the reverse direction to Figure 2.

In carrying the invention into effect in one form as shown in the drawings and applied to spigot and socket pipes, the socket $c$ is provided externally with projections $h$ distributed preferably equidistantly spaced and taking wedge-shaped form having a circumferential length dependent upon the number employed. One face $h^1$ of each of the projections is substantially coincident with the end surface $c^1$ of the socket, the other faces $c^2$, $c^2$ being inclined similarly to the plane containing the socket end $c^1$. These inclined faces in effect form a plurality of helically-advancing surfaces having equal angles of advance. An encircling cast iron or other ring $f$ is provided near one end with similar distributed inward projections $f^4$ for engagement with the projections $h$ through the helical surfaces $i$, $c^2$ and provides for axial pressure being applied upon the jointing material $g$ by an angular or rotational movement as already known. It is preferred to impart a short bevel to the leading ends of the projections $f^4$, as shown, to facilitate engagement of the respective helical surfaces. The ring $f$, instead of bearing directly on the jointing material as known, houses within it a separate joint-retaining ring $r$ having a flange $r'$ coarsely serrated to provide a number of parallel sided and equispaced radial projections $r^2$ adapted for entry past the projections $f^4$ above referred to and to fit freely between similar projections $s$ formed in the corner of the cylindrical part $f^3$ of the ring $f$ and an inwardly directed flange $f'$ thereof. Interlocking of the projections $r^2$, $s$ connects the joint-retaining ring $r$ and the ring $f$ in the rotational sense and enables the former to partake of any helical movement which may be imparted to the latter; while the free fit of these projections also permits of relative axial movement of the two rings. The cylindrical extensions $r^3$, $r^4$ on opposite sides of the flange $r'$ are a clearance fit over the pipe spigot $d$ and serve respectively for direct axial engagement of the jointing material $g$ and for stiffening the ring and assisting its location in the encircling member $f$.

For effecting a forward movement of the ring $r$ within the member $f$ a number of set screws $t$ are provided passing through tapped holes $t'$ in the flange $f'$ between the projections $s$ on the ring $f$ and opposite to the projections $r^2$, in such a way as to bear on the latter when screwed in. Headless set screws or grub screws of the kind shown are preferably employed, these being of substantial proportions and provided with square or other end openings $t^2$ for the ready reception and hold of a complementary turning tool, and they are preferably made of malleable iron on account of such metal having a high resistance to corrosion.

Radially penetrating the ring $f$ close to the inner sides of the projections $f^4$ are circumferentially extended holes $u$ which are cored in during casting, so that the before mentioned grub screws and tapped holes therefor are the only parts of the device calling for machining and destruction of the resistant skin referred to above. These extended holes radially coincide with and expose the projections $h$ on the socket exterior $c$ for enabling a tommy bar or the like to be inserted to effect rotation of the ring $f$ in relation to the socket.

In tightening up a joint constructed as above, it is preferred to screw back the set screws $t$ to allow the ring $r$ to recede, as in Figure 1, into the member $f$ sufficiently to enable a preliminary pressure to be applied to the jointing material simply by the rotational operation, namely, by helically interlocking the projections $h$ and $f^4$. This operation is conveniently effected partly by hand rotation of the ring $f$, and the correct circumferential alignment of the projections, as shown in Figure 2, with increasing pressure on the jointing material is then obtained by inserting a tommy bar through one of the openings $u$ to find one end of a projection $h$ and using the latter as a fulcrum from which the ring $f$ can be levered round further to the desired position. The final sealing pressure is then applied by rotation of the set screws $t$ to force the joint-retaining ring $r$ from the position shown in Figure 1 further into the socket $t$ against the jointing material $g$.

The material employed for jointing pipes as above may vary according to requirements and may consist, as is well known, and shown in Figure 4, of a triangular section hard rubber ring $o$ tipped at $p$ preferably with lead. However, it is possible with the improved joint to use metal joint rings, even solid metal rings, that is, rings, consisting of deformable metal such as lead, or comprising an envelope of such material (see for instance Moulton and Another's British Patent No. 374,493) on account of forces tending to produce the undesirable circumferential distortion hereinbefore mentioned being avoided and heavy pressure being applicable to the jointing material in a straight axial direction.

It is to be understood that modifications may be made to the device above described without departing from the scope of the invention as hereinafter defined. Also while the use of a tightening gear such as is claimed in British Patent No. 343,217 is not excluded herefrom the need for such provision may be regarded as obviated by the introduction of other means as described above for obtaining the final sealing pressure. Apart from thus effecting a saving of cost the present invention removes the difficulty which, especially in connection with larger diameter pipes, attaches to the provision and operation of a gear of the kind mentioned.

Having thus described my invention, what I claim as new and desire to secure by Letters Patent of the United States is:

1. In a pipe joint having accommodation for jointing material in an annulus defined by overlapping end regions of adjacent pipe sections and a ring slidable over one section for axial pressure application upon jointing material in position in the other section, means for advancing said ring by a partial turn helically towards the latter section and separately operable means enabling said ring to be advanced additionally with a straight axial movement.

2. In a pipe joint having accommodation for jointing material in an annulus defined by overlapping end regions of adjacent pipe sections, a ring slidable over one section for axial pressure application upon jointing material in position in the other section, a second ring having lugs with helical surfaces coengageable with like surfaces of lugs disposed on the latter section for advancing the first ring helically towards said latter section and circumferentially distributed screw means operatable upon said two rings for enabling said first ring to be advanced also with a straight axial movement.

3. In a pipe joint having accommodation for jointing material in an annulus between overlapping spigot and socket regions of adjacent pipe sections, a pair of elements encircling and rotatable about the pipe, which elements are rotationally connected together and mutually axially displaceable, one of said elements being connectible with the socket through means presenting coengageable helical surfaces each extending round only a portion of the socket and the other of said elements being operative axially for pressure application upon jointing material in position in the socket, and means for producing mutual axial displacement between said two elements.

4. A spigot and socket pipe joint with accommodation for jointing material after the fashion of a gland between spigot exterior and socket interior and an element rotatable about the pipe which element is operative through segmental abutments having helically disposed co-operative surfaces between the socket and jointing material in position in said socket said surfaces associating with any rotational movement of said rotatable element an axial component of movement for applying axial pressure upon said material and additional means operatively located between the socket and said material manipulatable independently of rotation of said rotatable element, for augmenting said axial pressure upon the jointing material.

5. In combination with a spigot and socket pipe joint having jointing material accommodatable between the mating sections as in a gland, a pair of rings encircling and rotatable about the pipe, said rings being connected together by lugs affording them freedom for axial displacement while preventing their relative rotation, one of said rings being connectible with the socket through complementary lugs engageable in helical surfaces and circumferentially distributed screws operatable between said two rings for producing mutual axial displacement thereof.

6. In a spigot and socket pipe joint having jointing material accommodatable between spigot exterior and socket interior as in a gland, a ring rotatable about the pipe in engagement with the latter through abutments having helically disposed surfaces adapted to associate with any rotational movement of said rotatable element an axial component of movement for applying axial pressure upon said material, and a second ring interposed between said material and said first-mentioned ring with means operable independently of rotation of said first ring for augmenting said axial pressure upon the jointing material.

7. In a pipe joint, a gland ring and means for axially moving it into forcible engagement with jointing material, said means comprising a ring constrained by segmental pipe surfaces when rotated to execute a helical movement on the pipe and independently manipulatable thrust screws operative between said ring and said gland ring.

PERCY HUTCHINSON WILSON.